(12) United States Patent
Rhyu et al.

(10) Patent No.: US 8,698,754 B2
(45) Date of Patent: Apr. 15, 2014

(54) KEYPAD FOR ELECTRONIC DEVICE AND MANUFACTURING METHOD THEREOF

(75) Inventors: Ho-Suk Rhyu, Gyeongsangbuk-do (KR); Shin-Chul Kang, Seoul (KR); Sung-Sun Park, Gyeongsangbuk-do (KR); Jae-Chul Jin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 519 days.

(21) Appl. No.: 12/714,633

(22) Filed: Mar. 1, 2010

(65) Prior Publication Data

US 2010/0245253 A1   Sep. 30, 2010

(30) Foreign Application Priority Data

Mar. 27, 2009  (KR) .................. 10-2009-0026490

(51) Int. Cl.
  *G09G 5/00*  (2006.01)
(52) U.S. Cl.
  USPC .......................................... 345/170; 200/311
(58) Field of Classification Search
  USPC .............. 345/170; 200/309–313, 314; 341/33
  See application file for complete search history.

(56) References Cited

U.S. PATENT DOCUMENTS

| | | | |
|---|---|---|---|
| 5,542,770 A * | 8/1996 | Lin | 400/477 |
| 7,369,064 B2 * | 5/2008 | Yeh | 341/22 |
| 7,725,140 B2 * | 5/2010 | Kang et al. | 455/575.1 |
| 7,847,204 B2 * | 12/2010 | Tsai | 200/314 |
| 2005/0202878 A1 * | 9/2005 | Hwang et al. | 463/43 |
| 2007/0029554 A1 * | 2/2007 | Nakamura et al. | 257/72 |
| 2007/0267497 A1 | 11/2007 | Tracy et al. | |
| 2008/0051162 A1 * | 2/2008 | Kim et al. | 455/575.3 |
| 2008/0087533 A1 * | 4/2008 | Choi et al. | 200/311 |
| 2008/0218371 A1 * | 9/2008 | Joo | 340/815.65 |
| 2009/0065337 A1 | 3/2009 | Chiam et al. | |

FOREIGN PATENT DOCUMENTS

| | | | |
|---|---|---|---|
| EP | 1971112 A2 | 9/2008 | |
| KR | 2007-74687 | 7/2007 | ............. H01H 11/00 |

* cited by examiner

*Primary Examiner* — Tom Sheng
(74) *Attorney, Agent, or Firm* — Cha & Reiter, LLC (57) ABSTRACT

A keypad for an electronic device and manufacturing method thereof having at least one or more ink layers which selectively let pass or cut off a light wavelength of at least one or more light emitting diodes generating light in accordance with an opened or closed direction of a folder. At least one or more light emitting elements for generating light in various colors are provided, and a diffusion ink layer is arranged above the light emitting elements. At least one or more ink layers provided on the diffusion ink layer, wherein the ink layers selectively let passes or cut-off light wavelengths of the light emitting elements when the folder is rotated or slid in a longitudinal or perpendicular direction. A transparent or semi-transparent ink layer is provided on the ink layers, and a sheet film layer is provided on the transparent or semi-transparent ink layer.

15 Claims, 10 Drawing Sheets

KEYPAD FOR ELECTRONIC DEVICE AND MANUFACTURING METHOD THEREOF

CLAIM OF PRIORITY

This application claims the benefit of priority under 35 U.S.C. §119(a) from an application entitled "Keypad For Electronic Device And Manufacturing Method Thereof" filed in the Korean Intellectual Property Office on Mar. 27, 2009 and assigned Serial No. 10-2009-0026490, the contents of which are hereby incorporated by reference in its entirety.

BACKGROUND OF THE INVENTION

1. Field of the Invention

The present invention relates to a keypad for an electronic device and a manufacturing method thereof. More particularly, the present invention is related to a keypad for a folder-type portable telecommunication device and to a manufacturing method thereof.

2. Description of the Related Art

Figure 2:
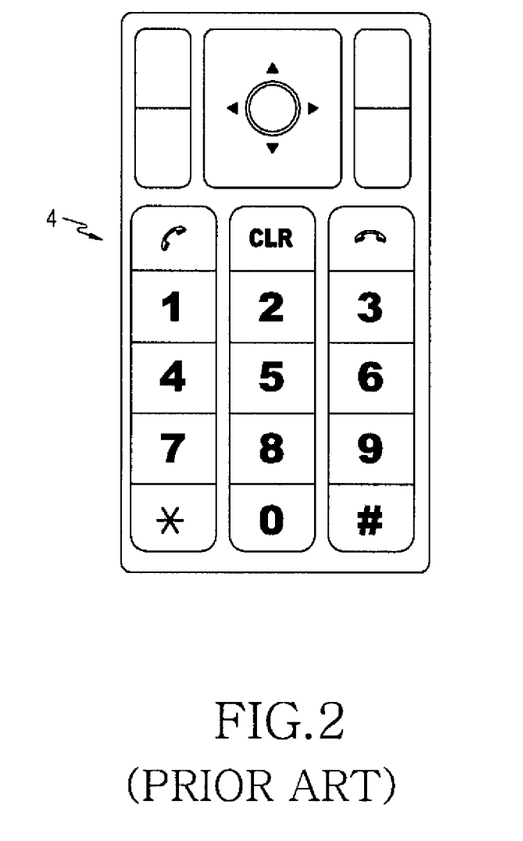
FIG. 2 is a front view illustrating a keypad arrangement of FIG. 1.

In general, a portable telecommunication device refers to a device that provides wireless communication with another party, while carrying the device. Such a portable telecommunication device includes a hand held product (HHP), a CT-2, a cellular phone, a digital phone, a personal communications service (PCS) phone, a personal digital assistant (PDA) or the like, which may be classified into various types depending on shapes or appearances thereof. For example, portable telecommunication devices can be classified into a bar-type, a flip-type, a folder-type, or a slide-type according to its appearance. The conventional portable telecommunication devices such as those listed above are typically provided with an antenna, a data input/output unit, and a transmitting/receiving unit or the like. As for the data input/output unit, a keypad capable of inputting data by typically pushing the keys with a user's fingers has come into wide-spread use. FIG. 2 shows an example of a conventional keypad of this type.

Generally, the folder-type portable telecommunication device includes a main housing; a folder being rotated in a longitudinal direction from or toward the main housing; and a hinge for enabling the folder to be rotated.

However, the conventional folder-type portable telecommunication device has drawbacks in that it is inconvenient to watch television or movies through the screen of the display part of the folder for a long time since the folder is configured to be only opened in a lengthwise direction, i.e., a longitudinal direction thereof.

In order to solve some of the drawbacks as described above, there is provided a Korean Laid Open Patent Publication No. 2005-104836, which discloses constructions of a conventional double axis hinge-type portable telecommunication device in detail.

Figure 1:
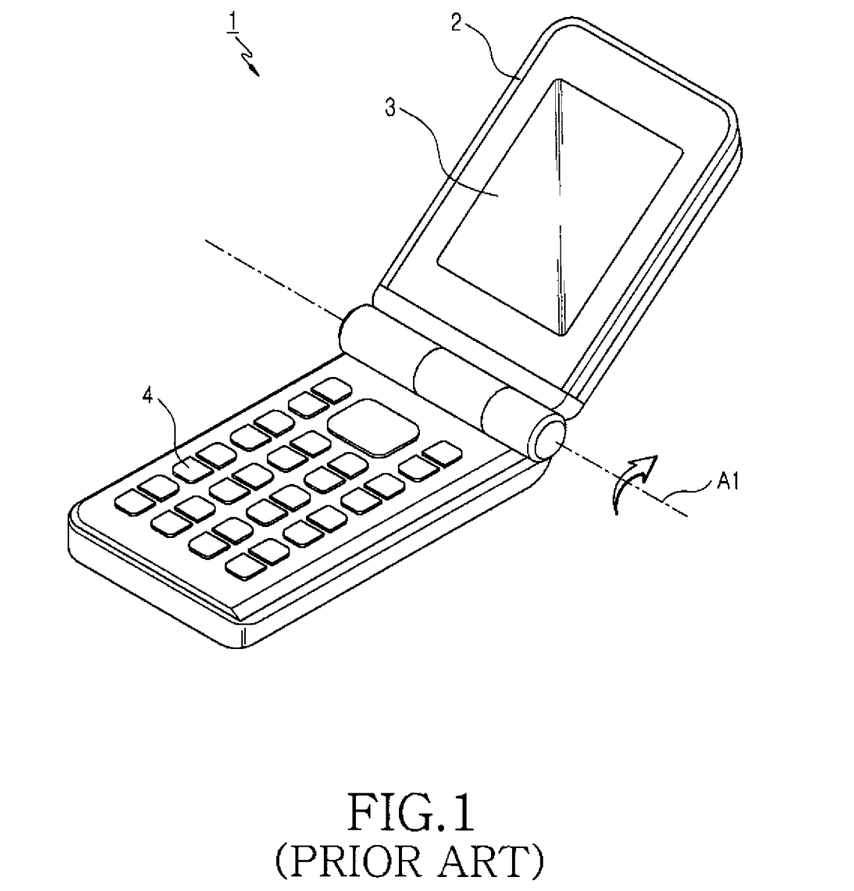
FIG. 1 is a perspective view illustrating a dual axis hinge-type portable telecommunication device in the prior art, wherein a folder is opened in a longitudinal direction.
Figure 3:
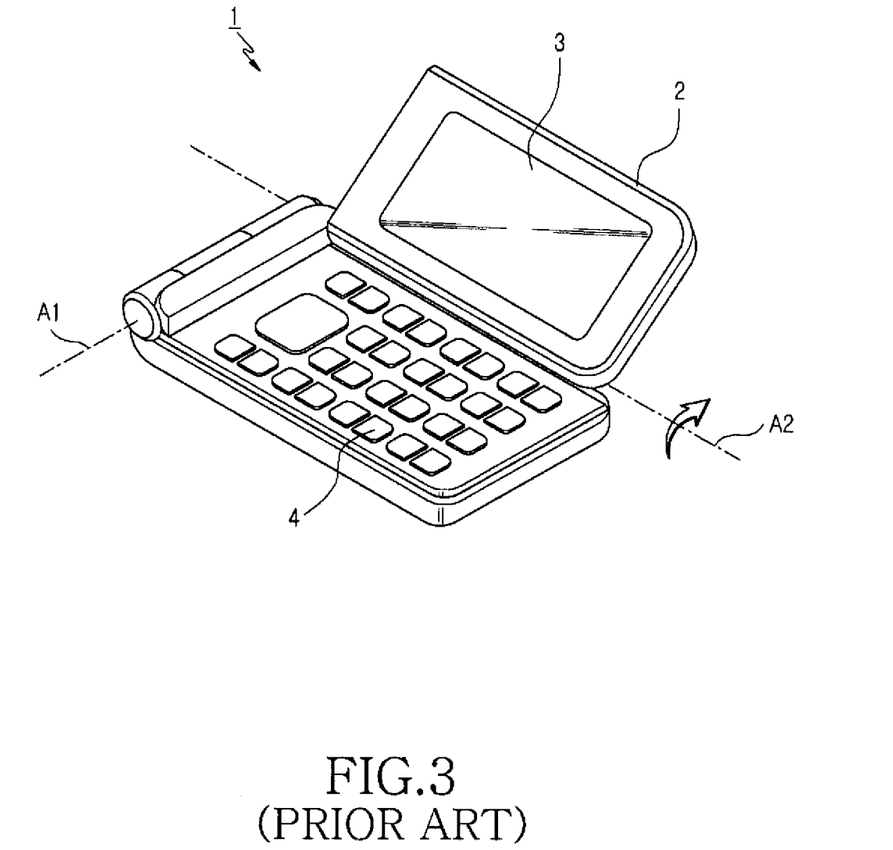
FIG. 3 is a perspective view illustrating the dual axis hinge-type portable telecommunication device in the prior art, wherein the folder is opened in a perpendicular direction.
Figure 4:
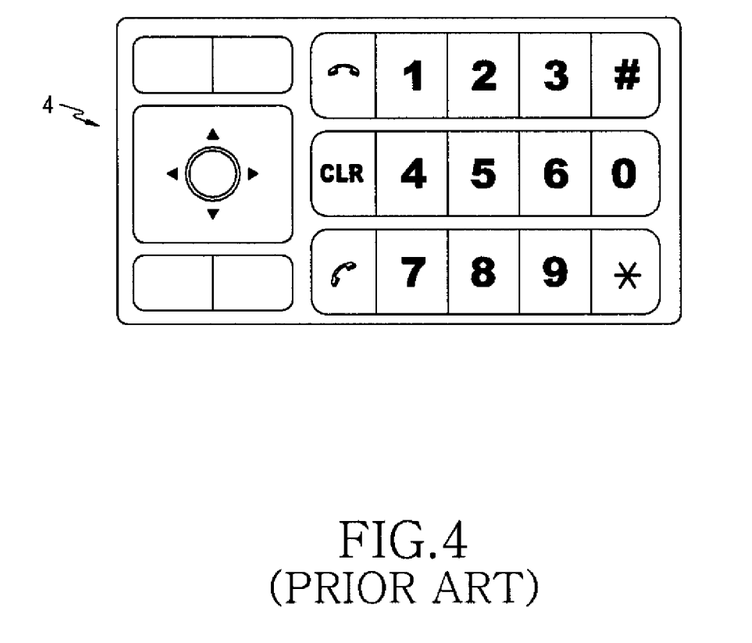
FIG. 4 is a front view illustrating the keypad arrangement of FIG. 3.
Figure 5:
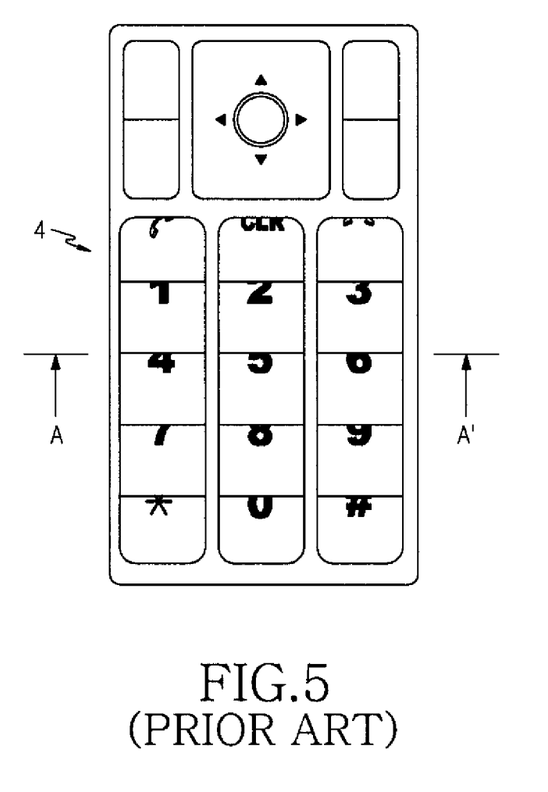
FIG. 5 is a front view illustrating operational procedures of the keypad of the dual hinge-type portable telecommunication device in the prior art.

As shown in FIGS. 1 and 3, the folder 2 of a double axis hinge-type portable telecommunication device 1 can be rotated in a transverse or longitudinal direction according to a use mode selected by the user.

When the display part 3 of the folder 2 is opened in the longitudinal direction as in FIG. 1, it is easy to input letters using a keypad 4. However, it has still drawbacks in that when the display part 3 is rotated and disposed in the transverse direction as in FIG. 3, the key inputting operation becomes more difficult because the letters formed on the keypad 4 are arranged in the longitudinal direction, not in the transverse direction.

To solve the above drawbacks, as shown in FIGS. 1 through 5, there has been developed a sliding keypad 5, which can change the arrangement of the letters in accordance with the opening direction of the folder 2 by sliding the letter sheet of the keypad 4 when the folder is opened in the longitudinal (FIG. 2) or transverse direction (FIG. 4), i.e., a direction perpendicular to the longitudinal direction of the device (referred to as a "perpendicular direction" hereinafter).

Figure 6:
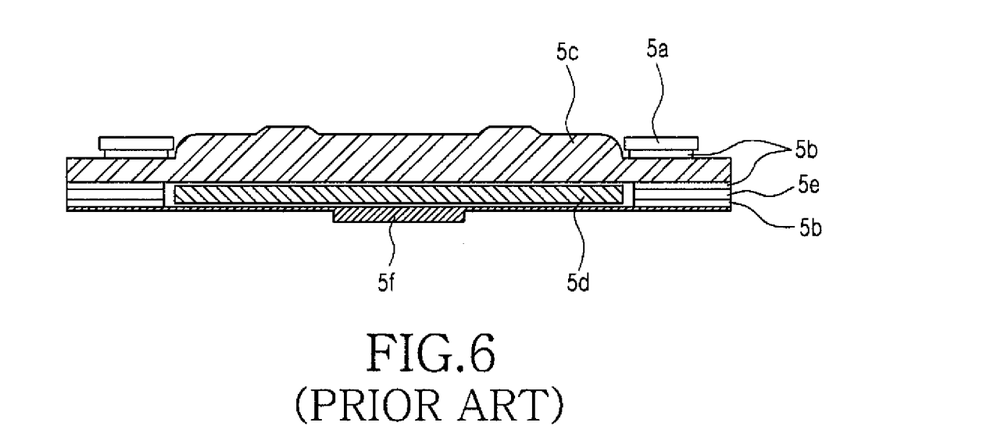
FIG. 6 is a cross-sectional view taken along line A-A of FIG. 5.

Referring now to FIG. 6, the conventional sliding keypad 5 includes a dummy film layer 5a, a first double-faced tape layer 5b, and a main sheet layer 5c having a upper surface with a UV and a vapor deposited rear surface, a sliding sheet layer 5d, a film layer 5e providing a space for the sliding sheet layer 5d, a second double-faced tape layer 5b, and a film layer for forming a UV contact point.

The conventional sliding keypad 5 with the construction shown in FIG. 6 becomes worn down due to the friction with the main sheet layer and other components when the sliding sheet layer slidably moves. In addition, the thickness of the keypad increased because of its multi-layered construction, which lessens a feeling of a "click" when the user presses down the keypad. Furthermore, cracks are easily formed more easily in the upper layer of the keypad due to its high hardness.

Hence, there has been a need to develop a keypad for an electronic device with improved construction and usability than known heretofore.

SUMMARY OF THE INVENTION

Accordingly, the present invention has been made to provide a keypad for an electronic device and method of manufacture which can improve usage of the keypad. According to the present invention, the keypad is constructed of one or more ink layers, which selectively let pass or cut off wavelengths of at least one or more light emitting elements generating color light in accordance with an opened or closed direction of a folder.

Also, the present invention provides a keypad for an electronic device and its manufacturing method which can improve a feeling of a click and miniaturize the device with a smaller thickness by constructing one or more ink layers, which selectively let pass or cut off wavelengths of at least one or more light emitting elements emitting color light in accordance with an open or close direction of a folder that is particularly suitable for of a folder-type communication device.

Further, the present invention provides a keypad for an electronic device and a method of manufacture which can improve aesthetic appearances of a keypad design by being constructed of one or more ink layers that irradiate the keypad in various colors in accordance with an opened or closed direction of a folder.

In accordance with an exemplary aspect of the present invention, there is provided a keypad for an electronic device, including: at least one or more light emitting elements for generating light in various colors; a diffusion ink layer provided above the light emitting elements; at least one or more ink layers provided on the diffusion ink layer, wherein the ink layers selectively pass or cut off light wavelengths of the light emitting elements when a folder is rotated or slid in a longitudinal or perpendicular direction; a transparent or semi-transparent ink layer provided on the ink layers; and a sheet film layer provided on the transparent or semi-transparent ink layer.

In accordance with another exemplary aspect of the present invention, there is provided a method for manufacturing a keypad for an electronic device, including the steps of: providing first and second light emitting elements for generating light in various colors; providing a diffusion ink layer above the first and second light emitting elements; providing first and second ink layers on the diffusion ink layer, wherein the ink layers selectively pass or cut off light wavelengths of the light emitting elements when a folder is rotated or slid in a longitudinal or perpendicular direction; providing a transparent or semi-transparent ink layer on the ink layers; and providing a sheet film layer on the transparent or semi-transparent ink layer.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION

Hereinafter, exemplary embodiments of the present invention will be described with reference to the accompanying drawings. In the following description, a detailed description of known functions and configurations incorporated herein may be omitted when it may obscure appreciation of the subject matter of the present invention by a person of ordinary skill in the art.

Referring now to FIGS. 7 through 10, an exemplary embodiment of a keypad 10 for an electronic device preferably includes at least one or more light emitting elements 11 and 12, a diffusion ink layer 14, at least one or more ink layers 15, a transparent or semi-transparent ink layer 16, and a sheet film layer 17.

Figure 8:
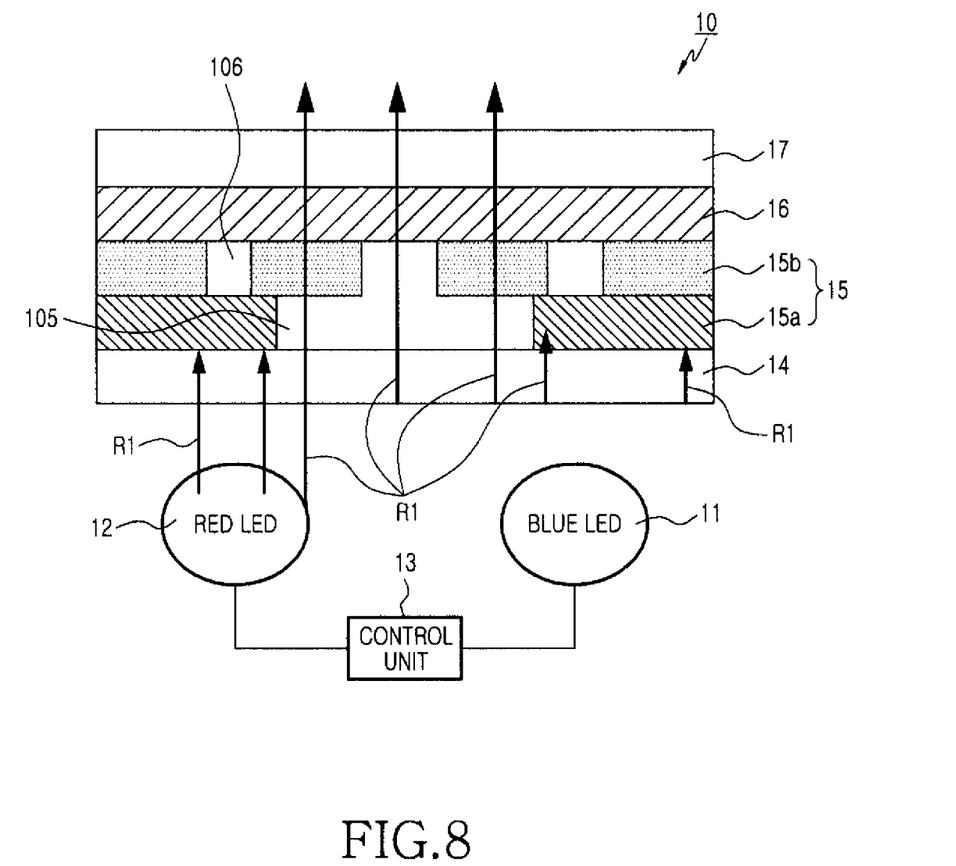
FIG. 8 is a cross-sectional elevation view illustrating operational procedures of the keypad in FIG. 7.

The light emitting elements 11, 12, which are not limited to the colors indicated in FIG. 8, are provided under the diffusion ink layer 14, which are designed to generate and irradiate light wavelengths thereof onto the diffusion ink layer 14, the ink layers 15, the transparent or semi-transparent ink layer 16, and the sheet film layer 17. The light emitting elements 11 and 12 include a first light emitting element 11 and a second light emitting element 12. The first light emitting element 11 is composed of a blue color light emitting diode (LED) for generating a blue light wavelength B1, while the second light emitting element 12 is composed of a red color light emitting diode (LED) for generating a red light wavelength R1.

Still referring to FIG. 8, the diffusion ink layer 14 is provided above the first and second light emitting elements 11 and 12, which allows the light having the wavelengths B1 and R1 emitted from the first and second light emitting elements 11 and 12 to be penetrated into and diffused therethrough. The ink layers 15 are disposed on the diffusion ink layer 14, which activate the first and second light emitting elements 11 and 12, and then allow the light having the blue and red wavelengths B1 and R1 emitted from the first and second light emitting elements 11 and 12 to be selectively passed through or cut off. Meanwhile, the transparent or semi-transparent ink layer 16 is provided on the ink layers 15, which enables the light having the blue and red wavelength B1 and R1 of the first and second light emitting elements 11 and 12 and being selectively passed through or cut off by the ink layers 15 to be penetrated thereinto.

The sheet film layer 17 is disposed on the transparent or semi-transparent ink layer 16, which is adapted to protect the latter and further diffuses the light with the blue and red wavelengths B1 and R1 of the first and second light emitting elements 11 and 12 to the outside which has been passed through the transparent or semi-transparent ink layer 16. The sheet film layer 17 is composed of a polycarbonate (PC) film. Alternatively, the sheet film layer 17 may be made from a polyurethane (PU) film or a Polyethylene terephthalate (PET) film.

While the first and second light emitting elements 11 and 12 described above adopt a blue or red color LED as a preferred example, other LEDs generating different colored light wavelengths can be employed to the keypad 10 instead of the blue or red color LED, the number of LEDs is not limited to two.

In the above description, a dual axis hinge-type portable telecommunication device is illustrated as a representative example for the electronic device 1. However, the inventive keypad 10 is not limited to the dual axis hinge-type portable telecommunication device, and it can be applicable to a variety of types of the portable telecommunication device, such as a sliding-type portable telecommunication device which can be slidably displaceable in the longitudinal or perpendicular direction.

Figure 10:
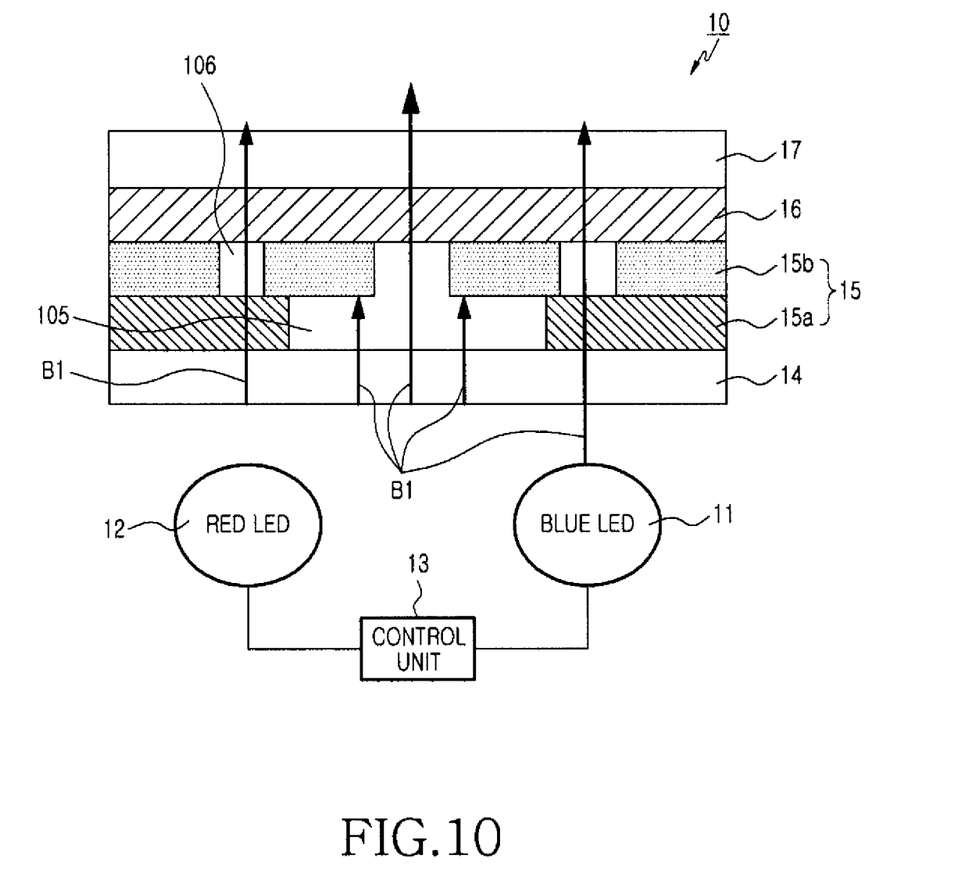
FIG. 10 is a cross-sectional elevation view illustrating operational procedures of the keypad in FIG. 9.

As shown in FIGS. 8 and 10, the keypad 10 is provided with a control part 13 for selectively activating the first and second light emitting elements 11 and 12 when the folder 2 of the electronic device 1 is rotated or slid in a longitudinal or perpendicular direction.

Referring to FIGS. 8 and 10, a first ink layer 15a allows just the wavelength B1 of the first light emitting element 11 to be passed through (which in this case is blue light), while the first ink layer 15a cuts off the wavelength R1 (which in this case is red light) of the second light emitting element 12. In contrast, a second ink layer 15b allows only the red light wavelength R1 of the second light emitting element 12 to be passed through, while it intercepts the blue light wavelength B1 of the first light emitting element 11.

The first ink layer 15a, as shown in FIGS. 7 through 10, is formed with a first printing part 105 for arranging letters, numbers, marks or the like in the same direction as that of the folder 2 when the folder 2 of the electronic device 1 is rotated or slid in the perpendicular direction. On the other hand, the second ink layer 15b is formed with a second printing part 106 for arranging letters, numbers, marks or the like in the same direction as that of the folder 2 when the folder 2 is rotated or slid in the longitudinal direction.

Operations of the keypad for the electronic device having the construction as described above in accordance with a preferred exemplary embodiment of the present invention will be described in more detail with reference to FIGS. 7 through 10 hereinbelow.

Referring to FIGS. 7 through 10, the keypad 10 for the electronic device 1 includes the first and second light emitting elements 11 and 12, the diffusion ink layer 14, the first and second ink layers 15a and 15b, the transparent or semi-transparent ink layer 16, the sheet film layer 17, and the control part 13.

When the folder 2 of the electronic device 1 is rotated in the longitudinal direction (FIG. 7), the control part 13 detects such motion and activates the red color LED of the second light emitting element 12 to generate red light, as shown in FIGS. 7 through 10.

As shown in FIG. 8, the red light wavelength R1 of the red color LED is designed to generate light onto the second ink layer 15b passing through the diffusion ink layer 14. It should be noted here that while the second ink layer 15b cuts off the blue light wavelength B1 of the first light emitting elements 11, it allows only the red light wavelength R1 to be passed through. Hence, the red light wavelength R1 is passed through the second ink layer 15b to illuminate the second printing part 106, but the first printing part 105 of the first ink layer 15a is not illuminated.

The red light wavelength R1 passing through the second ink layer 15b is penetrated into the transparent or semi-transparent ink layer 16 and the sheet film layer 17 in turn, and then diffused to the outside, as shown in FIG. 8.

Figure 7:
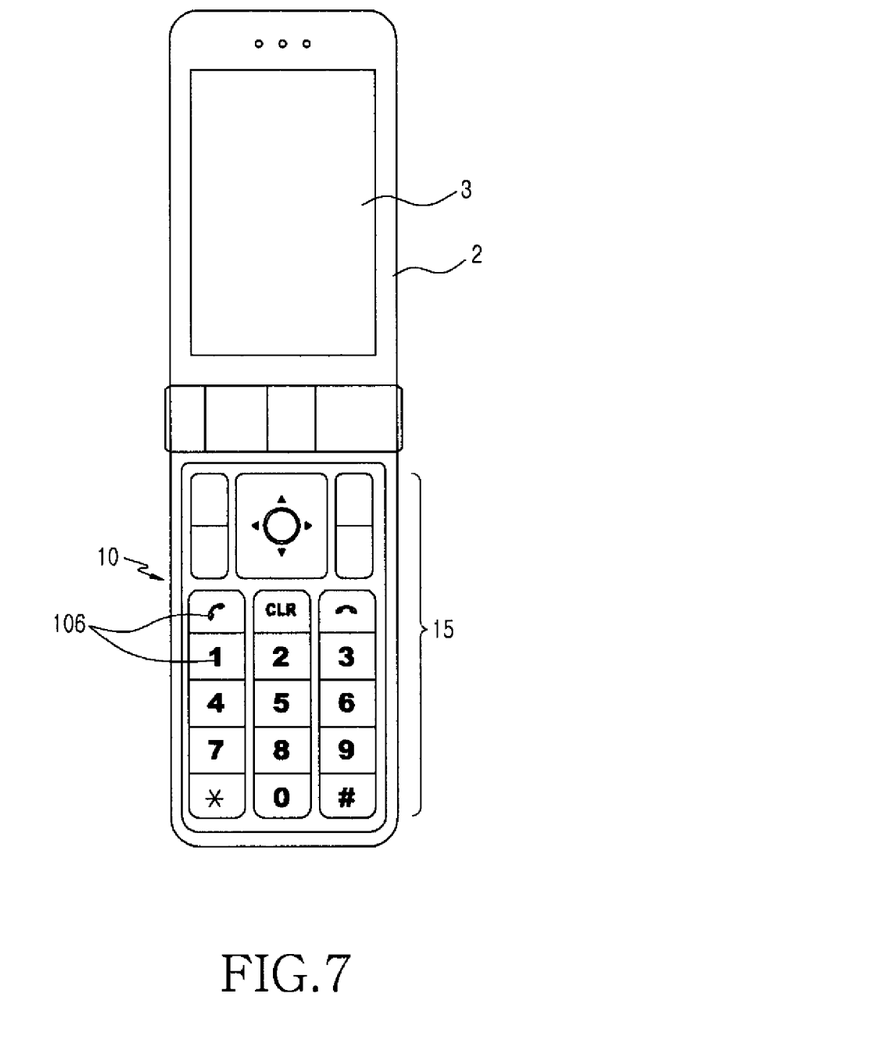
FIG. 7 is a front view illustrating a keypad for an electronic device in accordance with a preferred exemplary embodiment of the present invention, wherein a folder is opened in the longitudinal direction.

As shown in FIGS. 7 and 8, the folder 2 of the electronic device 1 is opened in the longitudinal direction, and the letters formed on the keypad 10 are also arranged in the longitudinal direction, while emitting the red light wavelength R1.

Figure 9:
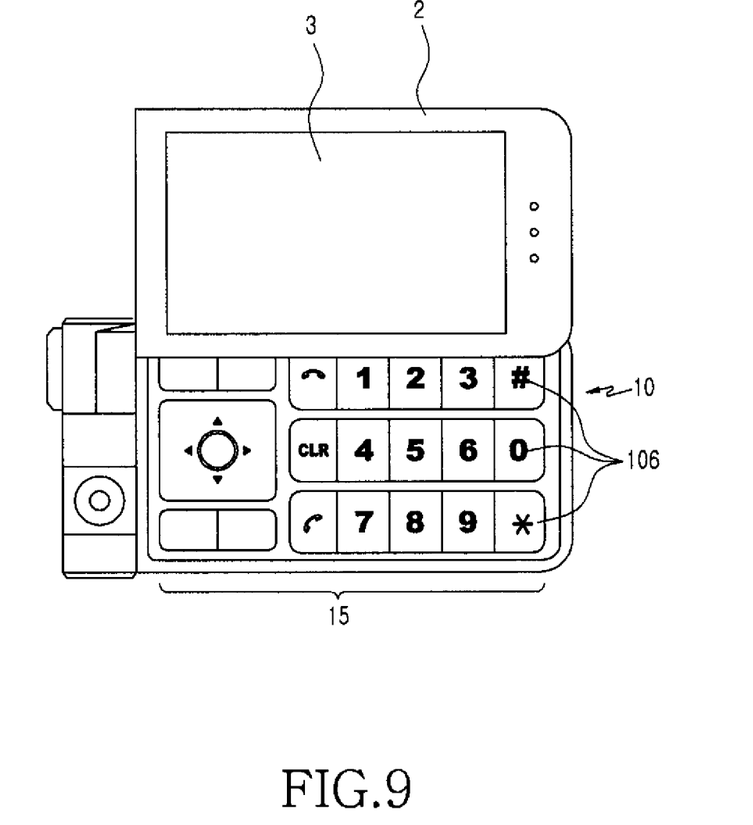
FIG. 9 is a front view illustrating the keypad for the electronic device in accordance with a preferred exemplary embodiment of the present invention, wherein the folder is opened in the perpendicular direction.

In contrast, when the folder 2 of the electronic device 1 is rotated in the perpendicular direction as shown in FIGS. 9 and 10, the control part 13 detects such motion and activates the blue color LED of the first light emitting element 11 to generate blue light. Then, the blue light wavelength B1 of the blue color LED is illuminated onto the first ink layer 15a through the diffusion ink layer 14.

While the first ink layer 15a cuts off the red light wavelength R1 of the second light emitting elements 12, it allows only the blue light wavelength B1 (in this particular example) to be passed through as shown in FIG. 10.

As shown in FIG. 9, the first ink layer 15a allows the blue light wavelength B1 to be passed through as well as illuminates the first printing part 105, but the second printing part 106 of the second ink layer 15b is not illuminated. Next, the blue light wavelength B1 passing through the first ink layer 15a is penetrated into the transparent or semi-transparent ink layer 16 and the sheet film layer 17 in turn, and then diffused to the surroundings.

With continued reference to FIG. 9, the folder 2 of the electronic device 1 is opened in the perpendicular direction, and the letters formed on the keypad 10 are also arranged in the perpendicular direction, while emitting a blue light wavelength B1.

As described in the above, it should be appreciated that the usage of the keypad 10 can be improved by arranging the letters of the keypad 10 in the same direction as that of the folder 2 of the electronic device 1 when the keypad 10 is rotated in the longitudinal or perpendicular direction, as well as by changing the emitting colors of the keys depending upon the rotational direction of the folder 2.

Meanwhile, if the transparent ink layer is selected from the transparent or semi-transparent ink layer 16, the first and second ink layers 15a and 15b disposed under the transparent ink layer may be visible from the outside, thereby improving the aesthetic appearance of the device.

On the other hand, if the semi-transparent ink layer is employed instead, the first and second ink layers 15a and 15b may be hidden and invisible from the outside before using the device. However, when the user begins to use the device, the blue color LED of the first light emitting element 11 is activated and then the first ink layer 15a is illuminated by the blue light wavelength B1 of the blue color LED. In addition, the red color LED of the second light emitting element 12 is activated and then the second ink layer 15b is illuminated by the red light wavelength R1 of the red color LED.

Operations of the manufacturing method for the keypad for the electronic device having the constructions as described above in accordance with a preferred exemplary embodiment of the present invention will be described in more detail with reference to FIG. 11 hereinbelow.

Figure 11:
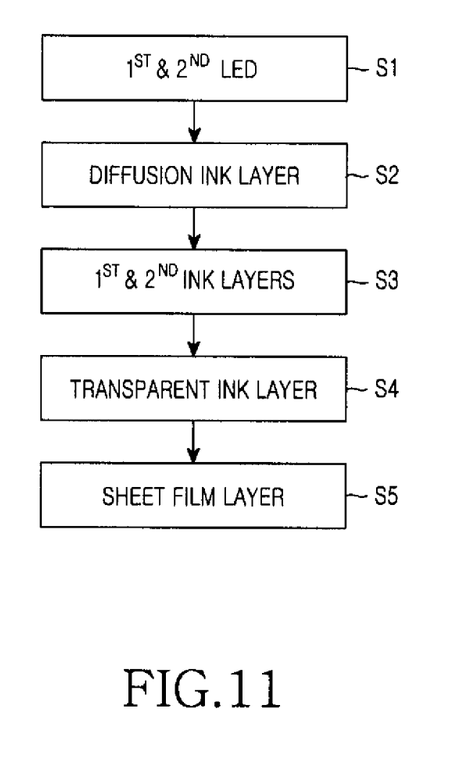
FIG. 11 is a flow chart illustrating a method for manufacturing the keypad for the electronic device in accordance with a preferred exemplary embodiment of the present invention.

Referring now to FIG. 11, the manufacturing method for the keypad for the electronic device is provided with the first and second light emitting elements 11 and 12 (S1).

The first light emitting element 11 is composed of the blue color LED for generating the blue light wavelength B1, while the second light emitting element 12 is made of the red color LED for emitting the red light wavelength R1. Again, the choice of colors is not limited to blue and red.

In Step S2, the diffusion ink layer 14 is disposed on the first and second light emitting elements 11 and 12 which are already provided at Step S1.

The first and second ink layers 15a and 15b are provided on the diffusion ink layer 14, which activate the first and second light emitting elements 11 and 12 and then allow the light having the blue and red wavelengths B1 and R1 emitted from the first and second light emitting elements 11 and 12 to be selectively penetrated through or cut off when the folder 2 of the electronic device 1 is rotated or slid in the longitudinal or perpendicular direction (S3).

The first ink layer 15a, for example, allows only the blue light wavelength B1 of the blue color LED of the first light emitting element 11 to be passed through when the folder 2 of the electronic device 1 is rotated or slid in the perpendicular direction, while it cuts off the red light wavelength R1 of the red color LED of the second light emitting element 12 and illuminates the second printing part 106 formed in the second ink layer 15b.

In Step S4, the transparent or semi-transparent ink layer 16 is provided on the first and second ink layers 15a and 15b. Then, the sheet film layer 17 is disposed on the transparent or semi-transparent ink layer 16 (S5).

The keypad 10 is provided with the control part 13 which selectively activates the first and second light emitting elements 11 and 12 when the folder 2 of the electronic device 1 is rotated or slid in the longitudinal or perpendicular direction.

It should be appreciated by a person of ordinary skill in the art that if the transparent ink layer is selected from the transparent or semi-transparent ink layer 16, the first and second ink layers 15a and 15b provided under the transparent ink layer 16 can be seen from the outside, which improves the aesthetic appearances of the device.

Moreover, it can also be appreciated by the person of ordinary skill in the art that if the semi-transparent ink layer is employed instead, the first and second ink layers 15a and 15b are hidden and invisible from the outside before using the device. However, when the user starts using the device, the blue color LED of the first light emitting element 11 is activated and then the first ink layer 15a is illuminated through the blue light wavelength B1 of the blue color LED. Furthermore, the red color LED of the second light emitting element 12 is activated, and then the second ink layer 15b is illuminated through the red light wavelength R1 of the red LED.

The exemplary embodiments of the keypad for the portable electronic device and the manufacturing method thereof set forth hereinabove have been presented for illustrative purposes only and, therefore, the present invention is not limited to these exemplary embodiments and drawings. It will be understood by those skilled in the art that various changes and modifications may be made without departing from the scope of the invention defined in the claims.

What is claimed is:

1. A keypad for an electronic device, comprising:
    at least one or more light emitting elements for generating light in a plurality of colors;
    a diffusion ink layer provided above the light emitting elements;
    at least two or more overlapping ink layers provided on top of an upper surface of the diffusion ink layer that irradiate the keypad, wherein the ink layers selectively pass light of at least one particular wavelength corresponding to at least one of the plurality of colors generated by the light emitting elements, and cuts off light having wavelengths corresponding to a remainder of the plurality of colors generated by the light emitting elements when a folder is rotated or slid in a longitudinal or perpendicular direction relative to the keypad in which a controller controls irradiation of the keypad with respectively distinguishable colors of the plurality of colors based on a sensed position of the folder relative to the keypad;
    a transparent or semi-transparent ink layer provided on top of an upper surface of the ink layers; and
    a sheet film layer provided on top of an upper surface of the transparent or semi-transparent ink layer.

2. The keypad for the electronic device as recited in claim 1, wherein said light of at least one particular wavelength corresponding to at least one of the plurality of colors generated by the light emitting elements is passed in only one of the longitudinal direction or perpendicular direction of the folder and cut off in the other direction.

3. The keypad for the electronic device as recited in claim 1, further comprising a control unit that selectively activates the one or more light emitting elements when the folder of the electronic device is rotated or slid in the longitudinal direction or perpendicular direction.

4. The keypad for the electronic device as recited in claim 3, wherein the one or more light emitting elements comprises a plurality of light elements, wherein a particular light element is activated in only one of the longitudinal direction or perpendicular direction.

5. The keypad for the electronic device as recited in claim 1, wherein the light emitting elements include a first light emitting element and a second light emitting element, and wherein the first light emitting element comprises a blue color LED and the second light emitting element comprises of a red color LED.

6. The keypad for the electronic device as recited in claim 5, wherein the first ink layer allows only light from the blue color LED to be passed through, and cuts off light from the red light LED of the second light emitting element; and
wherein the second ink layer allows only the red light of the red color LED to be passed through, and cuts off the blue light of the blue color LED of the first light emitting element.

7. The keypad for the electronic device as recited in claim 1, wherein the first ink layer is formed with a first printing part for arranging letters, numbers or marks in the same orientation as that of the folder when the folder of the electronic device is rotated or slid in the perpendicular direction; and
    wherein the second ink layer is formed with a second printing part for arranging letters, numbers or marks in the same orientation as that of the folder when the folder is rotated or slid in the longitudinal direction.

8. The keypad for the electronic device as recited in claim 7, wherein a control unit activates a blue color LED of a first light emitting element when the folder of the electronic device is rotated or slid in the perpendicular direction in its entirety, and the first ink layer allows the blue light of the blue color LED to be passed therethrough for illuminating the first ink layer, and wherein the first ink layer cuts off the red light wavelength; and
    wherein the control unit activates a red color LED of a second light emitting element when the folder of the electronic device is rotated or slid in the longitudinal direction, and the second ink layer allows the red light of the red color LED to be passed therethrough for illuminating the second ink layer and cuts off the blue light.

9. A method for manufacturing a keypad for an electronic device, comprising the steps of:
    providing first and second light emitting elements for generating light in a plurality of colors in which a controller controls irradiation of the keypad with respectively distinguishable colors of the plurality of colors based on a sensed position of a folder relative to the keypad;
    providing a diffusion ink layer above the first and second light emitting elements;
    providing first and second ink overlapping layers on top of an upper surface of the diffusion ink layer that irradiate the keypad, wherein the ink layers selectively let light pass or cut off light according to predetermined wavelengths output by the light emitting elements when the folder is rotated or slid in a longitudinal or perpendicular direction relative to the keypad;
    providing a transparent or semi-transparent ink layer on top of an upper surface of the ink layers; and
    providing a sheet film layer on top of the transparent or semi-transparent ink layer.

10. The method according to claim 9, wherein light of at least one particular wavelength corresponding to at least one of the plurality of colors generated by the light emitting elements is passed in only one of the longitudinal direction or perpendicular direction of the folder and cut off in the other direction.

11. The method as recited in claim 9, wherein the keypad is provided with a control unit, which selectively activates the light emitting elements when the folder of the electronic device is rotated or slid in the longitudinal or perpendicular direction.

12. The method as recited in claim 9, wherein the first light emitting element comprises a blue color LED, and the second light emitting element comprises a red color LED.

13. The method as recited in claim 9, wherein the first ink layer allows only the blue light wavelength of the blue color LED of the first light emitting element to be passed through and cuts off the red light wavelength of the red color LED of the second light emitting element; and wherein the second ink layer allows only the red light wavelength of the red color LED to be passed through, and cuts off the blue light wavelength of the blue color LED of the first light emitting element.

14. The method as recited in claim 9, wherein the first ink layer is formed with a first printing part for arranging letters, numbers or marks in a same orientation as that of the folder when the folder of the electronic device is rotated or slid in a perpendicular direction; and wherein the second ink layer is formed with a second printing part for arranging letters, numbers or marks in a same orientation as that of the folder when the folder is rotated or slid in a longitudinal direction.

15. The method as recited in claim 14, wherein a control unit activates the blue color LED of the first light emitting element when the folder of the electronic device is rotated or slid in the perpendicular direction in its entirety, and the first ink layer allows the blue light of the blue color LED to be passed therethrough for illuminating the first ink layer but cuts off a passage of the red light; and wherein the control unit activates the red color LED of the second light emitting element when the folder of the electronic device is rotated or slid in the longitudinal direction, and the second ink layer allows the red light of the red color LED to be passed therethrough for illuminating the second ink layer but cuts off a passage of the blue light.

\* \* \* \* \*